United States Patent [19]

Walker et al.

[11] Patent Number: 4,786,815

[45] Date of Patent: Nov. 22, 1988

[54] NON-CONTACT SENSOR WITH PARTICULAR UTILITY FOR MEASUREMENT OF ROAD PROFILE

[75] Inventors: Curtis M. Walker, Armada; Gordon R. Brown, Livonia, both of Mich.

[73] Assignee: K. J. Law Engineers, Inc., Farmington Hills, Mich.

[21] Appl. No.: 13,960

[22] Filed: Feb. 12, 1987

[51] Int. Cl.⁴ .......................................... G01N 21/86
[52] U.S. Cl. .................................... 250/560; 356/4
[58] Field of Search ........ 250/560, 561, 235, 201 AF; 356/1, 4

[56] References Cited

U.S. PATENT DOCUMENTS

| | | | |
|---|---|---|---|
| 4,373,805 | 2/1983 | Mallinson | 356/4 |
| 4,445,029 | 4/1984 | Nagaoka et al. | 356/4 |
| 4,629,882 | 12/1986 | Matsuda | 250/201 AF |
| 4,639,140 | 1/1987 | Levat | 356/4 |
| 4,647,209 | 3/1987 | Neukomm et al. | 356/1 |

*Primary Examiner*—David C. Nelms
*Assistant Examiner*—Stephone B. Allen
*Attorney, Agent, or Firm*—Barnes, Kisselle, Raisch, Choate, Whittemore & Hulbert

[57] ABSTRACT

An electro-optical sensor for measuring distance to a test surface, such as a road surface beneath a vehicle frame on which the sensor is mounted. The sensor includes a modulated light source for directing a light beam onto the test surface, and a photosensitive detector for receiving light diffusely deflected from the test surface and providing a pair of output signals indicative of orthogonal position coordinates of reflected light incident on the detector. The detector outputs are fed to amplifiers for obtaining sum and difference signals which are demodulated synchronously with energization frequency of the light source. Distance to the test surface is determined as a function of a ratio of the detector output differential to the detector output sum. In the preferred application of the invention for road profile measurement, a signal indicative of road profile is stored at increments of vehicle motion along the road surface.

7 Claims, 2 Drawing Sheets

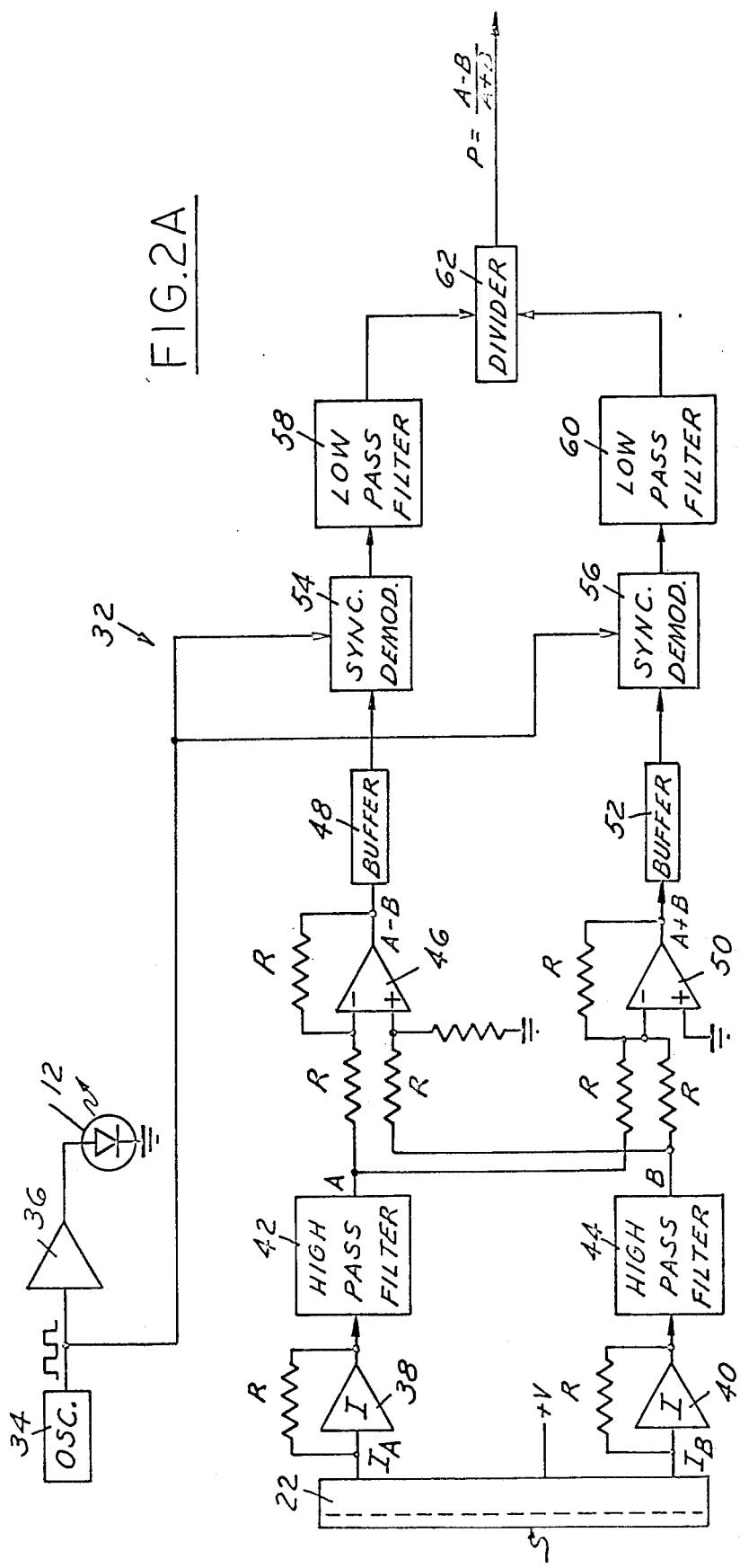

NON-CONTACT SENSOR WITH PARTICULAR UTILITY FOR MEASUREMENT OF ROAD PROFILE

The present invention relates to distance measuring apparatus, and more specifically to non-contact apparatus for measuring surface profile. Yet more specifically, the invention relates to apparatus for measuring the distance from a vehicle frame of reference to a road surface beneath the vehicle, or a bridge or the like above the vehicle, as the vehicle is driven over the road surface at normal traffic speeds.

BACKGROUND AND OBJECTS OF THE INVENTION

U.S. Pat. No. 4,456,829, assigned to the assignee hereof, discloses electro-optical apparatus for measuring distance to a relatively moving surface, such as distance to a road surface from a vehicle frame of reference passing thereover. The apparatus includes a light transmitter for projecting a rectangular beam vertically downwardly onto the road surface. A rotating scanner includes a circumferential array of facets for sequentially receiving an image diffusely reflected from the road surface and reflecting such image through a rectangular reticle onto a photodetector. Reference beams are sequentially reflected by the road image-reflecting scanner facets onto a reference detector. Distance to the road surface is determined as a function of the angle of incidence of the road image onto the scanner by comparing the time of incidence of the road image to the times of occurrence of the reference reflections on the reference detector. In the exemplary but preferred road-surface implementation, road surface profile is sampled and stored at successive increments of vehicle displacement as indicated by an encoder or the like coupled to a vehicle wheel.

Although the apparatus disclosed in the noted patent has enjoyed substantial commercial acceptance and success, improvements remain desirable in a number of respects. For example, it is desirable to eliminate any necessity for moving parts, such as the rotating scanner and drive motor. Furthermore, the plurality of light sources and detectors in the patented apparatus increase complexity and expense, both at the time of manufacture and during use when mechanical adjustments must be maintained. An object of the present invention, therefore, is to provide a sensor of the described character having no moving parts, and in which adjustments are substantially reduced or eliminated.

A more general object of the present invention is to provide non-contact distance measuring apparatus which embodies improved economy, reliability and accuracy in assembly and use, and which finds particular utility in the measurement of road profile. In furtherance of the foregoing, a more specific object of the invention is to provide an improved electro-optical scanner and system for measuring the profile of a relatively moving surface, such as a road surface.

SUMMARY OF THE INVENTION

Briefly stated, apparatus in accordance with the present invention comprises a light source and projection system for focusing a light beam onto the test surface. Light energy diffusely reflected from the test surface is received and focused onto a photosensitive device or detector which provides a pair of output signals as respective functions of orthogonal position coordinates of reflected light focused onto the detector surface. Distance to the test surface is determined as a function of the two detector output signals, specifically as a function of a ratio of a difference between such output signals to a sum of such output signals.

In the preferred embodiment of the invention, the light source comprises an IR diode coupled to an oscillator and whose output is therefore modulated at the oscillator output frequency. The photodetector output signals, specifically the output sum and difference signals, are coupled to the oscillator and demodulated synchronously with the diode drive signal. Such synchronous demodulation, coupled with filtering of the detector output signals, help eliminate errors due to background radiation and other environmental factors. To further enhance such isolation, reflections from the test surface are focused onto the photosensitive detector through an infrared filter.

In the preferred implementation of the invention for measuring road surface profile, the light source and detector are mounted at spaced positions on a vehicle frame, which establishes a measurement frame of reference. The light source is focused at a nominal distance beneath the vehicle frame, and the detector is oriented so as to receive reflections from the road surface within a measurement window centered at such nominal distance. Offset of the road surface from the nominal distance is then determined as a combined function of the ratio between the difference and sum of the detector output signals, the nominal distance to the road surface, separation between the source and detector on the vehicle frame, and angle of reflection between the incident and reflected light at the nominal surface distance.

BRIEF DESCRIPTION OF THE DRAWINGS

The invention, together with additional objects, features and advantages thereof, will be best understood from the following description, the appended claims and the accompanying drawings in which:

FIGS. 2A and 2B together comprise a schematic diagram of a presently preferred embodiment of sensor electronics illustrated in block form in FIG. 1.

DETAILED DESCRIPTION OF PREFERRED EMBODIMENT

Figure 1:
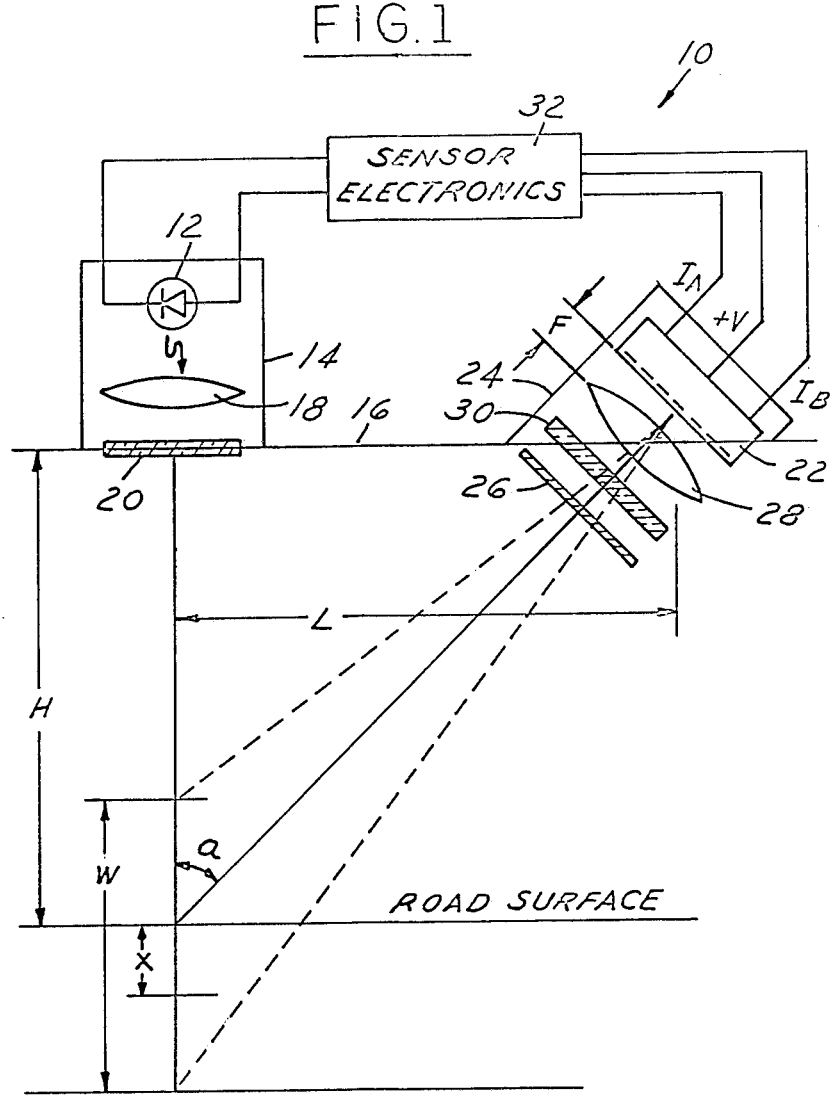
FIG. 1 is a schematic diagram of electr-optics in accordance with the present invention interacting for measurement of surface distance.

FIG. 1 illustrates a presently preferred embodiment 10 of distance measuring apparatus in accordance with the invention as comprising a light source LED 12 mounted within an enclosure 14 to the frame of a vehicle (not shown) which defines a horizontal frame of reference 16. Light energy from diode 12 is focused by a lens 18 through a window 20 onto a road surface at a nominal distance H from frame of reference 16. A photosensitive detector 22 is mounted within an enclosure 24 on vehicle frame of reference 16 at a position spaced by a nominal distance L from the vertical axis of lens 18. Light energy from LED 12 diffusely reflected from the road surface is received through a window 26 and focused by a lens 28 onto the opposing surface of detector 22. An infrared filter 30 is carried by enclosure 24 and in positioned between window 26 and lens 28. The central axis of detector 22 and lens 28 intersects the axis of lens 18 at the nominal distance H and at an angle a. LED 12 and photodetector 22 are connected to sensor electronics 32.

In a working embodiment of the invention for measuring road surface profile, diode 12 comprises an 100 mw IR diode having a peak wavelength of 800 nm. Lens 18 has a focal length of 85 mm and an aperture of f/1.8. Lens 28 likewise has a focal length of 85 mm and an aperture of f/1.8. Filter 30 is an 800 nm highpass filter. Photosensitive detector 22 comprises a dual-axis-duo-lateral PSD-S1352 detector for one-dimensional measurement marketed by Hamamatsu Corporation of Middlesex, New Jersey. The basic construction of this device includes opposed pairs of electrodes formed at edges of uniform resistive layers deposited on one side of a semiconductor photodiode. The surface layer forms a P-N junction and manifests a photovoltaic effect. When a dc voltage +V is applied to the semiconductor substrate, output currents are produced across opposed terminal pairs as respective functions of orthogonal position coordinates of a light spot focused onto the flat photosensitive surface of the detector. In the working embodiment of the invention, the nominal distance H is 12 inches, the measurement window W is ±3 inches and the angle a, which may be between 20° and 45°, is substantially equal to 45°. The distance $L = H^* \tan(a)$.

Position P of a light spot focused onto detector 22 is given by the expression: $P=(A-B)/(A+B)$, which of course is a measure of surface distance. It can be shown that displacement X from nominal distance H in FIG. 1 is given by the expression: $X=(P^*K1)/(K2+P^*K3)$, where $K1=(L^2+H^2)^{\frac{1}{2}}$, $K2=F^* \sin(a)$, $K3=\cos(a)$ and F is image distance from the center of lens 28 (FIG. 1) to the surface of photocell 22. Distance from frame of reference 16 to the test surface is given by: $H+X$.

Figure 2B:
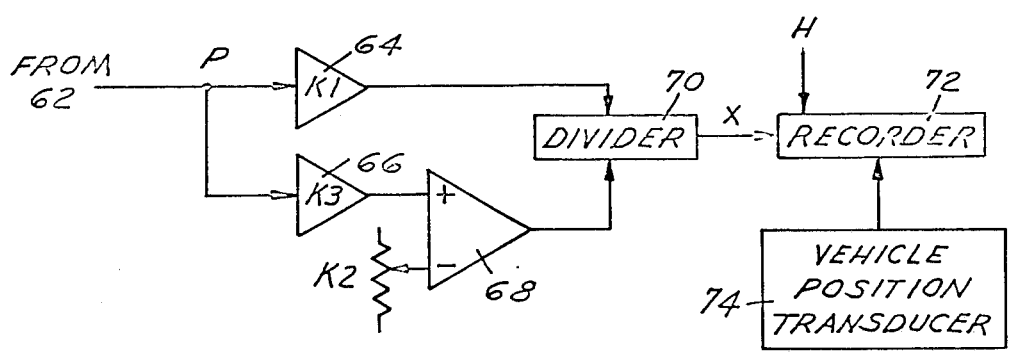

FIGS. 2A and 2B illustrate sensor electronics 32 for determination and storage of surface profile X, which of course is a measure of surface distance, in the preferred application of the invention for measurement of road surface profile. An oscillator 34 has a square wave output which is fed through an amplifier 36 to drive LED 12 at a fixed predetermined oscillator output frequency. The output frequency of oscillator 34 is not critical and is limited essentially by response capabilities of diode 12. Oscillator output frequency in the above-noted working embodiment of the invention is 8 kHz. Photodetector output currents $I_A$ and $I_B$ are fed through corresponding amplifiers 38, 40 to highpass filters 42, 44 respectively. In the working embodiment of the invention, filters 42, 44 comprise conventional RC filters having a cutoff frequency of 600 Hz. The outputs A and B of filters 42, 44 are fed through associated resistors to corresponding inputs of a differential amplifier 46, which provides an output to a buffer 48 indicative of the difference A−B between the detector output signals. Similarly, the outputs of filters 42, 44 are fed through associated resistors to a summing junction at the inverting input of an amplifier 50, which provides an output to a buffer 52 indicative of the sum A+B of the detector output signals. The outputs of buffers 48, 50 are fed to respective synchronous demodulators 54, 56, which receive control inputs from the output of oscillator 34. The outputs of demodulators 54, 56 are fed through corresponding lowpass filters 58, 60 to inputs of a divider 62. The output P of divider 62 is thus indicative of the ratio between the difference and sum signals—i.e., the ratio (A−B)/(A+B). Modulation of light source 12, coupled with synchronous demodulation of the detector output signals, further combined with electronic filters 42, 44 and 58, 60 and infrared filter 30 (FIG. 1), help isolate the measurement electronics from stray radiation and other environmental factors.

The output P of divider 62 (FIG. 2A) is fed to a first amplifier 64 (FIG. 2B) having a multiplication constant K1, and to a second amplifier 66 having a multiplication constant K3. The output of amplifier 66 is fed to the non-inverting input of a differential amplifier 68, which has its inverting input connected to a voltage divider or the like set at a level corresponding to the constant K2. The outputs of amplifiers 64, 68 are fed to respective inputs of a divider 70, which thus provides the output X as a function of the expression $(P^*K1)/(K2+P^*K3)$. The output X of divider 70 is fed to a recorder 72 for storing road surface profile as an incremental function of vehicle travel over the road surface, as indicated by a vehicle position transducer 74 such as an encoder or the like coupled to a vehicle wheel. Recorder 72 may also receive an input indicative of the constant H, so as to record distance to the test surface either directly as a function of the expression (H+X), or indirectly by recording signal X alone. In the preferred embodiment of the invention, dividers 62,70 and amplifiers 64,66,68 are embodied in a suitably programmed digital microprocessor which includes an analog-to-digital converter for receiving the signal P.

The invention claimed is:

1. Apparatus for measuring distance to a surface comprising first means for directing a light beam onto said surface; second means including optically sensitive position detection means, and means for receiving light reflected by said surface and directing said reflected light onto said detection means, said detection means providing a pair of signal A and B as a function of orthogonal position coordinates of such reflected light incident on said detection means; means for providing a signal A−B as a function of a difference between said signals A and B; means for providing a signal A+B as a function of a sum of said signals A and B; means for indicating distance to the surface as a function of a ratio P of said difference signal A−B to said sum signal A+B; means mounting said first and second means to establish a frame of reference spaced by a nominal distance H from the surface, said apparatus being constructed to measure departure X of the surface from said nominal distance H within a measurement window W, said first and second means being separated by said mounting means by a distance L; and means for determining said distance X as a function of the equation: $X=(P^*K1)/(K2+P^*K3)$, where K1 is a constant equal to $(L^2+H^2)^{\frac{1}{2}}$, K2 is a constant equal to F sin(a), K3 is a constant equal to cos(a), a is angle of orientation between said first and second means at said nominal distance H, and F equals image distance.

2. The apparatus set forth in claim 1 wherein said first means includes means for modulating said light beam at predetermined frequency, and wherein said apparatus further comprises means coupled to said beam-modulating means for separately synchronously demodulating said sum and difference signals A+B and A−B at said predetermined frequency.

3. The apparatus set forth in claim 2 wherein said first means comprises an IR light source, and wherein said second means includes an IR filter for directing light at the IR wavelength of said source onto said detection means while masking background light from said detection means.

4. A system for measuring and recording road surface profile as a function of distance between successive increments of road surface and a vehicular inertial frame of reference traveling over the road surface, comprising first means mounted in fixed position with respect to a vehicle frame for directing a measurement light beam onto a road surface beneath the frame, second means mounted in fixed position on said frame spaced from said first means for receiving light energy from said first means reflected by the road surface, said second means including photosensitive means for providing a pair of output signals which vary as respective functions of orthogonal position coordinates of such reflected light incident on said detection means, third means for measuring distance to the road surface as a function of said pair of output signals at said detection means, and means responsive to incremental displacement of the vehicle over the road surface for sampling and storing successive measurements of said distance.

5. The apparatus set forth in claim 4 wherein said third means comprises means for determining said distance as a function of a ratio of a difference between said output signals to a sum of said output signals.

6. The apparatus set forth in claim 5 wherein said first means comprises means for modulating said light beam at predetermined frequency, and wherein said third means includes means coupled to said beam-modulating means for separately synchronously demodulating said output signals.

7. The apparatus set forth in claim 6 wherein said first means comprises an IR light source, and wherein said second means includes an IR filter for directing light at the IR wavelength of said source onto said detection means while masking background light from said detection means.

* * * * *